United States Patent
Rettew et al.

[15] 3,655,330
[45] Apr. 11, 1972

[54] PROCESS FOR THE PREPARATION OF ALUMINA AND MAGNESIUM ALUMINATE BODIES

[72] Inventors: Richard Raymond Rettew, Laurel; David Griffith Wirth, Jr., Wheaton; Newton Levy, Jr., Ellicott City, all of Md.

[73] Assignee: W. R. Grace & Co., New York, N.Y.

[22] Filed: Mar. 12, 1970

[21] Appl. No.: 19,121

[52] U.S. Cl. ............................23/52, 23/141, 23/143, 264/65
[51] Int. Cl. ............................C01f 7/02, C01f 7/34
[58] Field of Search ................23/52, 141, 142; 264/65

[56] References Cited

UNITED STATES PATENTS

| | | | |
|---|---|---|---|
| 3,311,482 | 3/1967 | Klingler et al. | 23/142 X |
| 3,343,915 | 9/1967 | Rossi et al. | 23/142 |
| 3,304,153 | 2/1967 | Bakker et al. | 23/52 |
| 2,590,219 | 3/1952 | Stephanoff | 208/152 |
| 3,509,057 | 4/1970 | Greger | 23/52 X |
| 3,317,145 | 5/1967 | Stephanoff | 241/5 |
| 3,530,209 | 9/1970 | Ho | 23/52 X |
| 2,805,167 | 9/1957 | McCreight et al. | 23/52 X |
| 3,026,177 | 3/1962 | St. Pierre et al. | 23/142 |
| 3,026,210 | 3/1962 | Coble | 23/142 X |

FOREIGN PATENTS OR APPLICATIONS

| | | | |
|---|---|---|---|
| 1,155,418 | 6/1969 | Great Britain | 23/52 |
| 1,169,378 | 11/1969 | Great Britain | 23/141 |

*Primary Examiner*—Herbert T. Carter
*Attorney*—Joseph P. Nigon and Kenneth E. Prince

[57] ABSTRACT

A process for preparing strong, chemically inert, alpha alumina or magnesium aluminate spinel ($MgAl_2O_4$) bodies. The alpha alumina bodies have densities of greater than 3.92 grams per cc, grain sizes of 2–6 microns and purities in excess of 99.9 percent and are sinterable to fine grain microstructures at temperatures below 1,550° C. The calcination of the alumina or spinel precursor is carried out in a system that carefully controls the rate of temperature rise and that carries out the calcination in the presence of water vapor.

13 Claims, No Drawings

PROCESS FOR THE PREPARATION OF ALUMINA AND MAGNESIUM ALUMINATE BODIES

Aluminas, having the properties enumerated above, find applications as pigments, in refractory ceramics, abrasives and as additives in various systems. One of the important areas of utility of these fine grained ultra pure alpha alumina powders is in the fabrication of strong, chemically inert alpha alumina bodies. In order to produce such bodies, it is necessary to compact and sinter these high purity submicron powders. In addition, it may be desirable for the sintering temperature not to exceed about 1,550° C., in order to obtain the fine grained microstructure suitable for use in applications such as preparing wear resistant parts, for example.

Magnesium aluminate spinel is a ceramic material with a variety of uses. It is cubic and hence can be made transparent. It has a higher melting point than alumina and can be used to replace the alumina when resistance to mechanical abrasion is not critical.

Our invention resides in the discovery that high purity submicron alumina or magnesium aluminate spinel can be sintered to high density at a given temperature or to a given density at lower temperature if careful attention is given to the calcination of the alpha alumina or magnesium aluminate spinel precursor. The important parameters we have observed are: temperature of calcination, length of calcination, furnace atmosphere, and to a lesser extent, the rate of temperature rise in a calcination furnace.

Generally, the most important parameters considered in the calcination are temperature of calcination and length of time at that temperature. In addition to these parameters, we have found that the rate of temperature rise is important and that the presence of water vapor at pressures of 0.2 to 1.0 atmosphere in the furnace is critically important if the powders having the desired property are to be recovered. The alpha alumina precursor, that is sintered by our novel process to the highly dense material, is prepared by fluid energy milling of feed stock composed of decomposable aluminum salts; their solutions, sols, or hydrates. The alpha alumina precursor product generally contains about 10 to 20 percent alpha alumina having a crystallite size of less than 500 Angstroms with 30-70 percent of the alumina being the amorphous alpha alumina precursor and the remainder an amorphous gamma alumina precursor.

The final product, after treatment in our novel process, is essentially all in the alpha phase. The magnesium aluminate spinel precursor is prepared by fluid energy milling a feed stock of decomposable salts of magnesium and aluminum, solutions of these salts or mixed magnesia-alumina sols or hydrates.

Thermally decomposable aluminum salts, such as the nitrates and chlorides have been fluid energy milled at high temperatures to prepare the alpha alumina precursor as a submicron reactive high purity ceramic powder. One of the problems encountered is the presence of a product that consists largely of hollow spheres about 1 micron in diameter having a wall thickness of a few hundred Angstroms. This product appeared because at least a portion of the feed material passed through a viscous liquid state prior to decomposition to the oxide in the fluid energy mill. These spheres frequently tend to retain their morphology when calcined in a relatively dry atmosphere.

We have discovered that if the fluid energy milling is carried out in the presence of steam, and the product recovered is calcined in steam, these remnant structures are converted to regularly shaped, nearly monodisperse, solid, submicron, alpha alumina powders or to magnesium aluminate spinel having improved density characteristics. The powders composed of such particles lend themselves to ceramic fabrication much more readily than do the powders containing hollow spheres and broken fragments of spheres. The powders containing the hollow spheres and broken sphere fragments appear to form densification centers which result in macroscopic voids in the fired body.

Grain growth control is critically important in preparation of powders used to form compacts. The grain growth is much more uniform in the case of compacts formed from monodispersed particles of alpha alumina or magnesium aluminate recovered from our process. The trace of residual volatiles retained in the powder diffuse out of the compact much more readily and have less tendency to become entraped within the body upon densification. Under these more favorable circumstances, the bodies can be sintered to higher density with less gas entrapment than in the case where a variety of particle sizes and shapes are present, particularly when these shapes include hollow spheres.

The function of the presence of water vapor in the calcination atmosphere is not clearly understood. Although, we do not wish to be bound thereby, we believe that the presence of water vapor increases the rate of surface diffusion by weakening the attractive forces between the aluminum +3 ions and the oxide ions on the surface of the alumina particles. This, we postulate, is due to hydroxyl ions being adsorbed on the +3 aluminum ions and hydrogen ions being adsorbed on the oxide ions, resulting in lowering of the effective attractive forces between the aluminum +3 and the oxygen ions on the crystal surface.

The increased rate of surface diffusion over a period of time results in a more nearly uniform surface from particle to particle. This is due to the fact that particles with sharp edges and very thin cross sectional areas, such as hollow spheres or their fragments, represent a condition of very high surface energy. The presence of water vapor in the atmosphere increases the rate of diffusion in these regions of high surface energy. The rate of diffusion will be related to the surface energy per unit area and the area of a given region. The net result of increasing the rate of surface diffusion is to form more nearly uniform sized particles, but at the same time to preserve the feature of small crystallite size.

It is common to add grain growth inhibitors to the alpha alumina powders prepared by our process prior to their fabrication. As little as 0.01 to 0.1 percent magnesia (MgO) (based on the weight of the alumina) is one of the more common grain growth inhibitors.

In our process, the alpha alumina precursor is calcined at temperatures of from about 900° To about 1,100° C. for periods of about 0.5 to 8 hrs. The magnesium aluminate spinal precursor can be calcined to yield a product capable of being sintered to greater than 97 percent of theoretical density by heating to temperatures of about 700° to 900° C. for periods of 0.5 to 8 hrs. The temperature in the calcination furnace is raised at a rate of 100° to 400° F. per hour until the desired temperature is reached. The alpha alumina product is then formed into the desired structure at a pressure of about 2,000 to 30,000 p.s.i.g. and fired at a temperature of about 1,350° to 1,550° C. for about 0.1 to 4 hrs.

Our invention is further illustrated by the following specific but non-limiting examples.

EXAMPLE 1

This example illustrates a satisfactory method of preparing the alumina precursor used as a raw material in our novel process.

A quantity of aluminum nitrate nonahydrate was milled in an 8 inch fluid energy mill. Steam was fed to the mill at an inlet temperature of 1,400° F. The mill outlet temperature was 800° F. The solid aluminum nitrate was fed to the mill at the rate of 250 grams per minute under air pressure at 150 p.s.i. The product contained 11 percent alpha alumina and amorphous alpha and gamma alumina precursors.

EXAMPLE 2

The effect of calcination time and temperature on the fired density of alumina was determined in a series of runs in which samples of the alpha alumina precursor prepared according to the process described in Example 1 were calcined in air.

The calcination was carried out with a rate of temperature rise of 400° F. per hour at various temperatures for various periods of time. Portions were then wet ball milled with magnesium nitrate $(MgNO_3)_2 \cdot 6H_2O$ solution in a concentration sufficient to add 0.1 weight percent MgO (based on the weight of the alumina) as a grain growth inhibitor. The product was dried at 80° C. for 16 hours, dry ball milled, pressed into green bodies at 25,000 p.s.i. and sintered at 1,450°, 1,550°, and 1,700° C. The fired densities as a function of calcination and sintering conditions are set out in the tables below:

TABLE I

The Effect of Calcination Time and Temperature on $Al_2O_3$ Fired Density 1,450° C. Fire

| Calcination Temp. (°C.) | Calcination Time (Hrs.) | | | |
|---|---|---|---|---|
| | 1 | 2 | 4 | 8 |
| 1,100 | 3.55 g/cc | 3.53 g/cc | 3.56 g/cc | 3.52 g/cc |
| | 3.58 | 3.54 | 3.57 | 3.54 |
| | 3.58 | 3.51 | 3.58 | 3.52 |
| 1,033 | 3.60 | 3.38 | 3.45 | 3.42 |
| | 3.61 | 3.39 | 3.42 | 3.45 |
| | 3.61 | 3.39 | 3.44 | 3.45 |
| 967 | 3.59 | 3.65 | 3.63 | 3.76 |
| | 3.59 | 3.60 | 3.62 | 3.76 |
| | 3.58 | 3.63 | 3.60 | 3.73 |
| 900 | 3.45 | 3.47 | 3.63 | 3.55 |
| | 3.48 | 3.45 | 3.59 | 3.56 |
| | 3.49 | 3.47 | 3.58 | 3.57 |

TABLE II

The Effect of Calcination Time and Temperature on $Al_2O_3$ Fired Density 1,550°—C. Fire

| Calcination Temp. (°C.) | Calcination Time (Hrs.) | | | |
|---|---|---|---|---|
| | 1 | 2 | 4 | 8 |
| 1,100 | 3.86 g/cc | 3.85 g/cc | 3.84 g/cc | 3.84 g/cc |
| | 3.86 | 3.85 | 3.85 | 3.87 |
| | 3.86 | 3.85 | 3.83 | 3.87 |
| 1,033 | 3.85 | 3.82 | 3.86 | 3.85 |
| | 3.86 | 3.85 | 3.85 | 3.85 |
| | 3.81 | 3.88 | 3.84 | 3.85 |
| 967 | 3.86 | 3.89 | 3.87 | 3.90 |
| | 3.87 | 3.89 | 3.87 | 3.89 |
| | 3.86 | 3.89 | 3.88 | 3.88 |
| 900 | 3.81 | 3.85 | 3.88 | 3.88 |
| | 3.81 | 3.82 | 3.86 | 3.87 |
| | 3.80 | 3.83 | 3.86 | 3.88 |

TABLE III

The Effect of Calcination Time and Temperature on $Al_2O_3$ Fired Density 1,700° C. Fire

| Calcination Temp. (°C.) | Calcination Time (Hrs.) | | | |
|---|---|---|---|---|
| | 1 | 2 | 4 | 8 |
| 1,100 | 3.87 g/cc | 3.89 g/cc | 3.91 g/cc | 3.91 g/cc |
| | 3.89 | 3.90 | 3.91 | 3.91 |
| | 3.89 | 3.90 | — | 3.91 |
| 1,033 | 3.84 | 3.91 | 3.88 | 3.91 |
| | 3.84 | 3.91 | 3.89 | 3.91 |
| | 3.85 | — | 3.89 | 3.91 |
| 967 | 3.89 | 3.91 | 3.90 | 3.84 |
| | 3.91 | 3.90 | 3.90 | 3.85 |
| | 3.90 | 3.92 | 3.89 | 3.86 |
| 900 | 3.93 | 3.92 | 3.92 | 3.91 |
| | 3.93 | 3.92 | 3.92 | 3.91 |
| | 3.93 | 3.93 | 3.92 | 3.91 |

It is apparent from these data that it is difficult to get densities in the order of 3.90 using air calcination. This density can be achieved when the bodies are fired at 1,700° C. However, firing at 1,700° C. is undesirable in that the grain growth is too great when the bodies are fired at this temperature and this rapid grain growth results in poor strength properties of the product.

EXAMPLE 3

This example illustrates the effect of steam addition in the calcination step. In this series of runs, samples of alumina, prepared according to the method described in Example 1, were calcined using the same equipment and conditions as in Example 2 except that the rate of temperature rise was decreased to 100 cc. per hour and the calcination was carried out in steam at a pressure of one atmosphere. The samples were wet ball milled with a quantity of magnesium nitrate sufficient to add 0.1 weight percent magnesia, dried at 80° C. for 16 hours, dry ball milled and pressed using the techniques describes in Example 2. The fired density as a function of calcination and firing temperature are tabulated below:

TABLE IV

The Effect of Calcination Time and Temperature on $Al_2O_3$ Fired Density 1,450° C. Fire

| Calcination Temp. (°C.) | Calcination Time (Hrs.) | | |
|---|---|---|---|
| | 2 | 4 | 8 |
| 1,050 | 3.53 g/cc | 3.47 g/cc | 3.54 g/cc |
| | 3.47 | 3.47 | 3.56 |
| | 3.46 | 3.49 | 3.57 |
| 975 | 3.53 | 3.47 | 3.54 |
| | 3.68 | 3.64 | 3.47 |
| | 3.68 | 3.64 | 3.49 |
| 900 | 3.70 | 3.70 | 3.69 |
| | 3.71 | 3.71 | 3.69 |
| | 3.71 | 3.72 | 3.69 |

TABLE V

The Effect of Calcination Time and Temperature on $Al_2O_3$ Fired Density 1,550° C. Fire

| Calcination Temp. (°C.) | Calcination Time (Hrs.) | | |
|---|---|---|---|
| | 2 | 4 | 8 |
| 1,050 | 3.87 g/cc | 3.86 g/cc | 3.89 g/cc |
| | 3.87 | 3.86 | 3.88 |
| | 3.86 | 3.87 | 3.88 |
| 975 | 3.91 | 3.91 | 3.88 |
| | 3.90 | 3.90 | 3.88 |
| | 3.90 | 3.90 | 3.88 |
| 900 | 3.91 | 3.90 | 3.90 |
| | 3.90 | 3.90 | 3.90 |
| | 3.90 | 3.91 | 3.90 |

TABLE VI

The Effect of Calcination Time and Temperature on $Al_2O_3$ Fired Density 1,700° C. Fire

| Calcination Temp. (°C.) | Calcination Time (Hrs.) | | |
|---|---|---|---|
| | 2 | 4 | 8 |
| 1,050 | 3.94 g/cc | 3.92 g/cc | 3.94 g/cc |
| | 3.93 | 3.92 | 3.94 |
| | 3.92 | 3.92 | 3.94 |
| 975 | 3.92 | 3.93 | 3.88 |
| | 3.92 | 3.92 | 3.88 |
| | 3.92 | 3.92 | 3.88 |
| 900 | 3.91 | 3.92 | 3.90 |
| | 3.91 | 3.92 | 3.91 |
| | 3.91 | 3.92 | 3.91 |

It is obvious from review of these data that steam calcination affords a method of effecting the density of 3.90 on calcination at 1,550° C. for periods of as little as 2 hours. The results are satisfactory on calcination at 900° C. when the product is calcined in a steam atmosphere.

EXAMPLE 4

In this example, magnesium carbonate was substituted for magnesium nitrate as an additive to supply the 0.1 percent MgO in the alumina as a grain growth inhibitor. In this series of runs, samples of the alumina precursor prepared according to the method described in Example 1, were calcined as in Examples 2 and 3. The calcined material was dry ball milled for 16 hours with sufficient magnesium carbonate to add 0.1 weight percent MgO (based on the weight of the alumina). The powder samples were pressed into green bodies at 25,000 p.s.i. and fired at 1,450°, 1,550°, and 1,700° C. The fired density as a function of calcination conditions and firing temperature are set out in the tables below:

TABLE VII

The Effect of Calcination Time and Temperature on $Al_2O_3$ Fired Density 1,450° C. Fire

| Calcination Temp. (°C.) | Calcination Time (Hrs.) | | |
|---|---|---|---|
| | 2 | 4 | 8 |
| 1,050 | 3.92 g/cc | 3.89 g/cc | 3.84 g/cc |
| | 3.91 | 3.89 | 3.83 |
| | 3.92 | 3.89 | 3.83 |
| 975 | 3.94 | 3.94 | 3.92 |
| | 3.94 | 3.94 | 3.93 |
| | 3.93 | 3.93 | 3.92 |
| 900 | 3.95 | 3.94 | 3.94 |
| | 3.95 | 3.94 | 3.95 |
| | 3.95 | 3.94 | 3.94 |

TABLE VIII

The Effect of Calcination Time and Temperature on $Al_2O_3$ Fired Density 1,550° C. Fire

| Calcination Temp. (°C.) | Calcination Time (Hrs.) | | |
|---|---|---|---|
| | 2 | 4 | 8 |
| 1,050 | 3.97 g/cc | 3.96 g/cc | 3.95 g/cc |
| | 3.97 | 3.96 | 3.94 |
| | 3.97 | 3.96 | 3.95 |
| 975 | 3.96 | 3.97 | 3.97 |
| | 3.96 | 3.96 | 3.97 |
| | 3.96 | 3.96 | 3.97 |
| 900 | 3.97 | 3.96 | 3.97 |
| | 3.97 | 3.96 | 3.97 |
| | 3.97 | 3.96 | 3.96 |

TABLE IX

The Effect of Calcination Time and Temperature on $Al_2O_3$ Fired Density 1,700° C. Fire

| Calcination Temp. (°C.) | Calcination Time (Hrs.) | | |
|---|---|---|---|
| | 2 | 4 | 8 |
| 1,050 | 3.95 g/cc | 3.95 g/cc | 3.95 g/cc |
| | 3.97 | 3.94 | 3.96 |
| | 3.95 | 3.94 | 3.95 |
| 975 | 3.94 | 3.95 | 3.94 |
| | 3.95 | 3.94 | 3.95 |
| | 3.94 | 3.93 | 3.94 |
| 900 | 3.95 | 3.95 | 3.95 |
| | 3.96 | 3.94 | 3.94 |
| | 3.94 | 3.95 | 3.95 |

EXAMPLE 5

The following example illustrates improved sinterability of magnesium aluminate spinel powders calcined in steam compared to similarly processed powders calcined in air.

Three separate lots were prepared that were designated Samples A, B, and C.

Sample A was prepared in the following manner. A mixed nitrate solution containing approximately 8 weight percent solids as oxides, having a magnesia to alumina molar ratio of 1.00 was passed through an 8 inch high temperature fluid energy mill. Steam was used as the grinding media. The feed rate was 150 ml. per minute and the exit temperature about 900° F. The lot designated Sample B was prepared as follows: A mixed nitrate solution was prepared to contain 8 weight percent solids as oxides and to contain a magnesia to alumina molar ratio of 1.0. A portion of this solution was coprecipitated with 5 molar ammonium hydroxide by increasing the pH to about 9.5. The slurry was then passed through an 8 inch fluid energy mill at a rate of about 150 ml. per minute. Steam was used as the grinding media. The exit temperature from the mill was about 900°C.

The lot designated Sample C was prepared as follows: Crystalline solid magnesium nitrate $Mg(NO_3)_2 \cdot 6H_2O$ and aluminum nitrate $Al(NO_3)_3 \cdot 9H_2O$ were heated to form a clear uniform melt. The melt was heated to 120°–130°C. and maintained at that temperature until paste was obtained to contain about 30 weight percent solids. The paste was cooled to a solid, comminuted and dried further at about 110° C. to about 40 weight percent as solids. Portions of each of the above samples were calcined for 4 hours in air and steam at 700°–900° C., dry-ball milled and cold-pressed using a pressure of 25,000 pounds per square inch. The resulting bodies were fired for 2 hours in air 1,200°–1,600° C. temperature range and the same furnace samples were fired together at each fire temperature to assure similar conditions during heat-up, soak and cooling. The densities were measured geometrically by water displacement. The data collected is set out in the table below:

TABLE X.—FIRED DENSITIES IN GRAMS PER CC. AFTER FIRING AT—

| | Calcine Temp., °C. | 1,200° C. | | 1,300° C. | | 1,400° C. | | 1,500° C. | | 1,600° C. | |
|---|---|---|---|---|---|---|---|---|---|---|---|
| | | Air | Steam | Air | Steam | Air | Steam | Air | Steam | Air | Steam |
| Sample: | | | | | | | | | | | |
| A | 700 | 2.47 | 2.56 | 2.64 | 2.66 | 2.76 | 2.96 | 3.31 | 3.38 | 3.30 | 3.38 |
| A | 800 | | | | | | | 3.18 | 3.43 | | |
| A | 900 | | | | | | | 3.32 | 3.42 | | |
| B | 700 | 2.02 | 2.51 | 2.13 | 2.58 | 2.22 | 2.30 | 2.95 | 3.35 | 2.67 | 3.20 |
| B | 800 | | | | | | | 2.54 | 3.24 | | |
| B | 900 | | | | | | | 2.95 | 3.20 | | |
| C | 700 | 2.20 | 2.97 | 2.33 | 3.07 | 2.51 | 3.25 | 2.93 | 3.45 | 3.01 | 3.47 |
| C | 800 | | | | | | | | | | |
| C | 900 | | | | | | | | | | |

It is obvious from review of these data that substantial improvement in the fired densities of the product can be achieved by steam calcination.

What is claimed is:

1. A process for preparing formed high purity, high density alumina bodies which comprises the steps of:
   a. preparing an alpha alumina precursor by milling a decomposable aluminum salt in a fluid energy mill,
   b. calcining said alumina in an atmosphere of steam at a pressure of 0.2 to 1 atmosphere and at a temperature above about 800° to 1,200° C. for about 0.5 to 8 hours,
   c. adding a grain growth inhibitor in a concentration of bout 0.1 weight percent of the alumina,
   d. forming the calcined alumina into the desired shape, at a pressure of about 2,000 to 30,000 p.s.i.g.,
   e. firing the formed alumina structure in air at a temperature of about 1,300°–1,600° C. for 0.1–4 hours, and
   f. recovering the high purity dense alumina body.

2. The process according to claim 1 wherein the decomposable aluminum salt is the nitrate, acetate, or formate.

3. The process according to claim 1 wherein the grain growth inhibitor is added to the alumina precursor as a solution of a soluble salt of the desired metal.

4. The process according to claim 1 wherein the grain growth inhibitor is magnesia and is added to the alpha alumina precursor as a nitrate solution or as a carbonate.

5. The process according to claim 1 wherein the steam calcination is carried out at a pressure of about 1 atmosphere.

6. The process according to claim 1 wherein the calcination in steam is carried out at 900° C. for 2 hours.

7. The process according to claim 1 wherein formed alumina body is fired at a temperature of about 1,300° to 1,550° C. for about 2 hours.

8. A process for preparing formed high purity, high density alumina bodies which comprises the steps of:
   a. preparing an alpha alumina precursor by milling an aluminum nitrate solution in a fluid energy mill,
   b. calcining the alumina precursor at a temperature of about 900° C. for about 2 hours in steam at a pressure of one atmosphere,
   c. adding magnesia to the alpha alumina precursor by contacting said precursor with a sufficient quantity of a magnesium nitrate or carbonate solution to provide 0.1 weight percent magnesia in the product,
   d. forming the calcined alumina at a pressure of about 2,500 p.s.i.g.,
   e. firing the formed alumina structure in air at a temperature of about 1,450° C. for 2 hours, and
   f. recovering the high purity dense alumina body.

9. The process according to claim 8 wherein magnesia is added by mixing the alpha alumina precursor with magnesium carbonate.

10. A process for preparing high purity, high density magnesium aluminate spinel bodies which comprises:
    a. preparing a magnesium aluminate spinel powder by decomposing a mixed solution of decomposable aluminum and magnesium salts in a fluid energy mill,
    b. calcining said powder in an atmosphere of steam at a pressure of about 0.2 to 1 atmosphere and a temperature of about 800° to 1,000° C.,
    c. forming said body at a pressure of at least about 10,000 p.s.i., and
    d. firing the formed body in air at a temperature of 1,450° to 1,650° C. and recovering the product ceramic body.

11. The process according to claim 10 wherein the decomposable salts are the nitrates, acetates, or formates.

12. The process according to claim 10 wherein the mixed solution is prepared to have a MgO to $Al_2O_3$ ratio of about 1.0.

13. The process according to claim 10 wherein the magnesium aluminate spinel powder is prepared by decomposing hydrous oxides of magnesium and aluminum prepared to have an MgO to $Al_2O_3$ ratio of about 1.0, in a fluid energy mill.

* * * * *